Nov. 20. 1951  E. H. CARRUTHERS  2,575,703
METHOD FOR PACKING FOOD PRODUCTS
Filed Aug. 8, 1946  5 Sheets-Sheet 1

INVENTOR.
EBEN H. CARRUTHERS
BY

Nov. 20, 1951     E. H. CARRUTHERS     2,575,703
METHOD FOR PACKING FOOD PRODUCTS
Filed Aug. 8, 1946     5 Sheets-Sheet 2

INVENTOR.
EBEN H. CARRUTHERS

Nov. 20, 1951 E. H. CARRUTHERS 2,575,703
METHOD FOR PACKING FOOD PRODUCTS
Filed Aug. 8, 1946 5 Sheets-Sheet 3
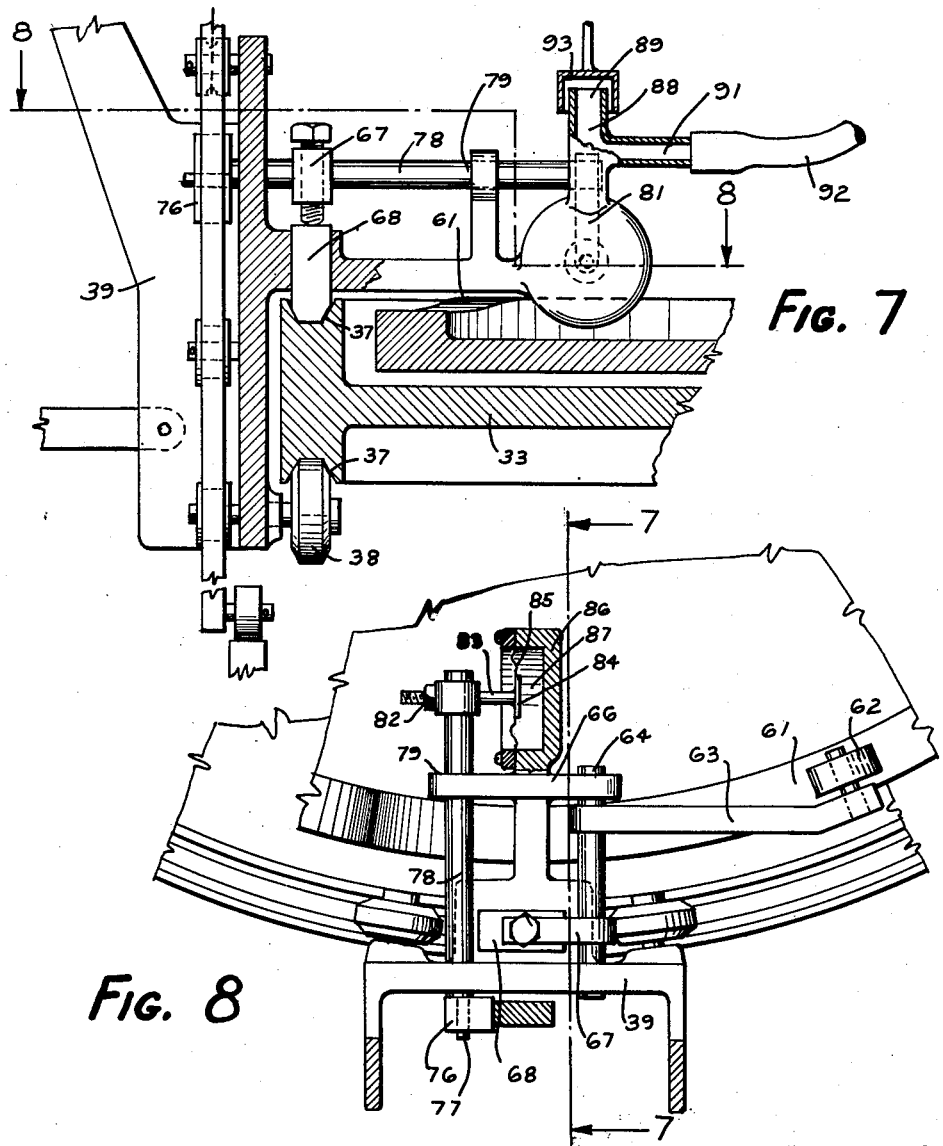
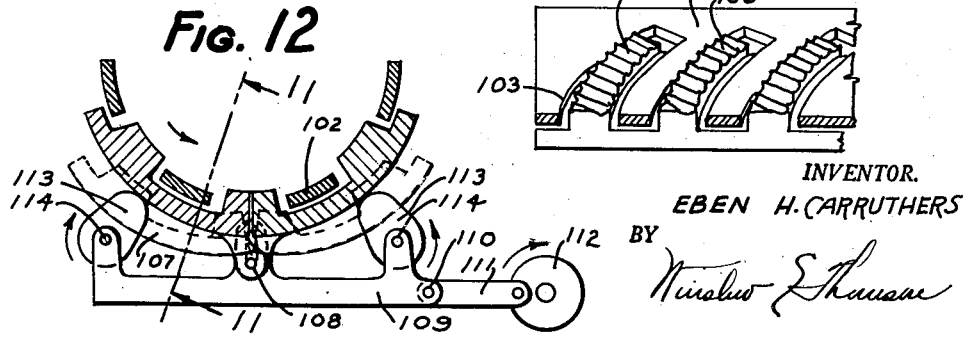
INVENTOR.
EBEN H. CARRUTHERS Nov. 20, 1951          E. H. CARRUTHERS          2,575,703
METHOD FOR PACKING FOOD PRODUCTS
Filed Aug. 8, 1946                                                      5 Sheets-Sheet 4
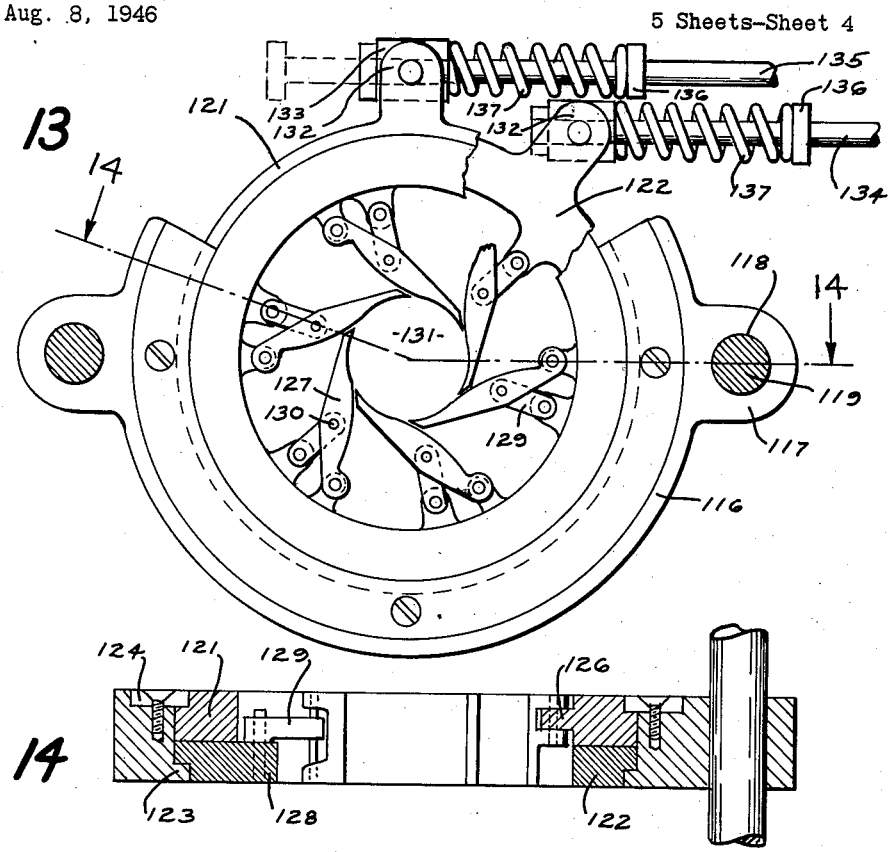
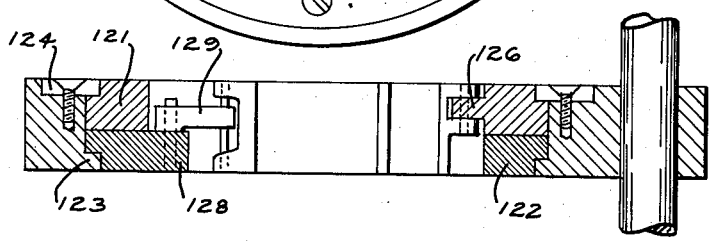
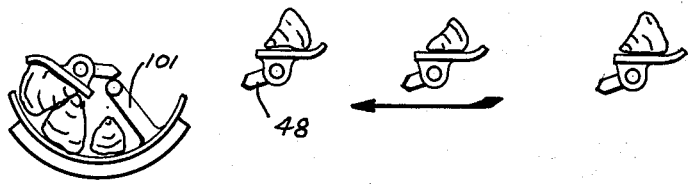
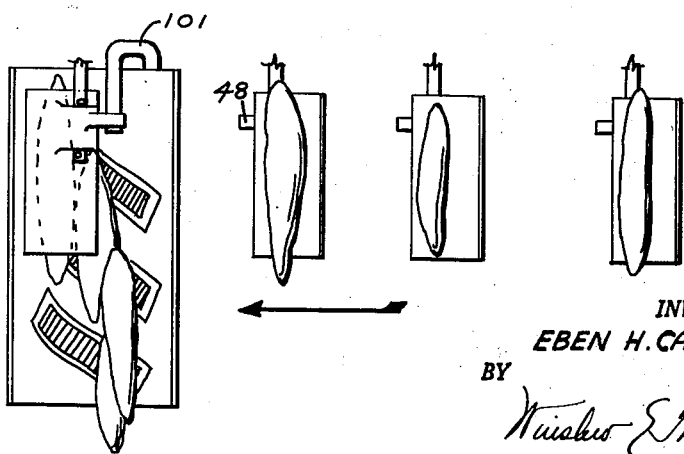
INVENTOR.
EBEN H. CARRUTHERS
BY

INVENTOR.
EBEN H. CARRUTHERS

Patented Nov. 20, 1951

2,575,703

UNITED STATES PATENT OFFICE 2,575,703

METHOD FOR PACKING FOOD PRODUCTS

Eben H. Carruthers, Warrenton, Oreg.

Application August 8, 1946, Serial No. 689,146

8 Claims. (Cl. 99—171)

My invention relates to a method of and apparatus for packing or canning materials or products, particularly food products, which may vary in weight, such as fish. While the method and apparatus of my invention will be described particularly in connection with the packing or canning of tuna fish, it will be appreciated that my invention has application to the packing of other food products where the product is susceptible of moulding or compacting. The method and apparatus has particular application to the packing of other fish products such as salmon or sardines.

An object of my invention is to provide an improved method and apparatus, particularly adapted to the packing or canning of fish such as tuna.

Another object of my invention is to provide a method and means of packing fish, particularly tuna, which eliminates the present necessity of cutting each loin of fish separately transversely of the loin into pieces corresponding to the height of the can into which the pieces are to be packed and the subsequent packing of the individual cut pieces into the can in which the tuna is to be marketed.

Another object of my invention is to provide a method and apparatus for canning fish wherein weighing mechanism is provided adapted to feed the fish loins for subsequent packing operations at a substantially uniform weight rate per unit of distance, or at intervals of time proportional to their weight.

A further object of my invention is to provide a method and apparatus for packing or canning fish wherein the fish loins are fed to a series of compacting and conveying moulds at a substantially uniform rate per unit of weight with the compacting and conveying moulds being arranged so as to compact the mass and level out or equalize unevenness in the flow of fish whereby a substantially constant weight of fish may be packed in each can.

My invention further contemplates the provision of a continuous method and apparatus adapted to weigh fish loins; separate the individual loins by distances proportional to their weights; feed the fish loins to a conveying compacting and moulding unit; feed the mass into a can; and cut the mass at uniform intervals of length with each cut length being substantially the weight of fish desired to be placed in the can or other container.

Other objects and advantages of my invention will be particularly pointed out in the claims and will be apparent from the following description, when taken in connection with the accompanying drawings, in which:

Fig. 7 is a side elevation partly in section showing portions of the weighing mechanism.

Fig. 8 is a top plan view partly in section and taken substantially on the line 8—8 of Fig. 7.

Fig. 9 is a diagrammatic view showing how pieces or loins of tuna are carried by the weighing platters and placed or dumped into the feed chute;

Fig. 10 is a top plan view of Fig. 9;

Fig. 11 is a sectional view taken substantially on the line 11—11 of Fig. 12 and showing a section of the feed chute;

Fig. 12 is a transverse section of Fig. 11 showing the means for actuating the feeding helices of the feed chute;

Fig. 13 is a side elevation of one of the compacting moulds of the compacting and moulding unit;

Fig. 14 is a sectional view taken substantially on the line 14—14 of Fig. 13;

Figure 17:
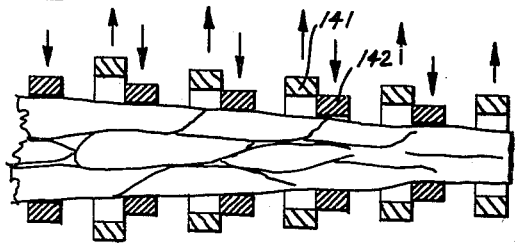
Figure 18:
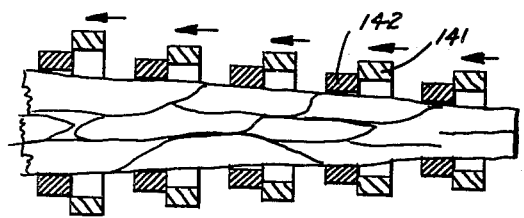
Figure 19:
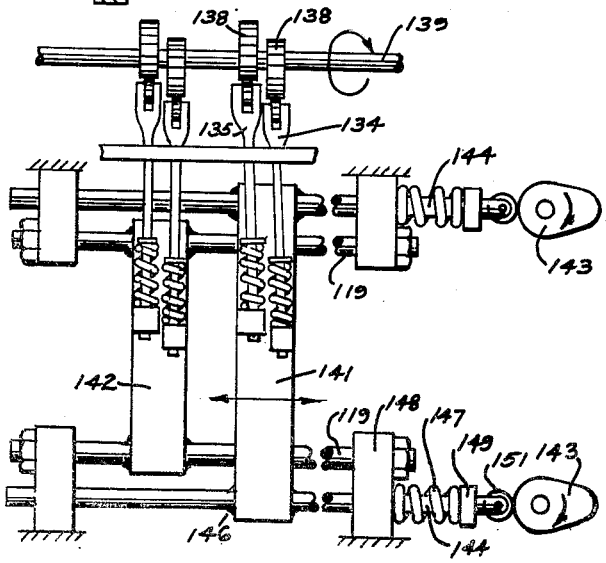

Figs. 15 to 18 inclusive are related diagrammatic views illustrating the operation of the chucks or compacting moulds of the moulding and conveying unit; and Fig. 19 is a top plan view showing how the mould units or chucks may be actuated so as to open and close the same and also illustrating how alternate chucks may be moved longitudinally of the moulding and conveying unit.

In general, the method of my invention comprises the feeding of whole loins (quartered sections of fish) to an automatic weighing machine which separates the loins by distances proportional to their weight. The weighing mechanism, as a whole, has been designated by the numeral 20. The weighing mechanism feeds the fish loins to a feed chute, generally indicated by the numeral 21, dropping or placing the loins in the feed chute at intervals of time proportional to their weights.

Means are provided in the feed chute 21 for conveying the loins to a moulding and conveying unit generally indicated by the numeral 22 which rolls, compacts and moulds the fish loins into a cylindrical mass of continuous form which is substantially of uniform weight per unit of length. The moulding and conveying unit 22 feeds successive lengths of fish to a packing station, generally indicated by the numeral 23, at which position the cylinder of fish is cut off in uniform lengths of substantially equal weight, the weight of fish desired to be packed in a standard can.

Figure 2A:
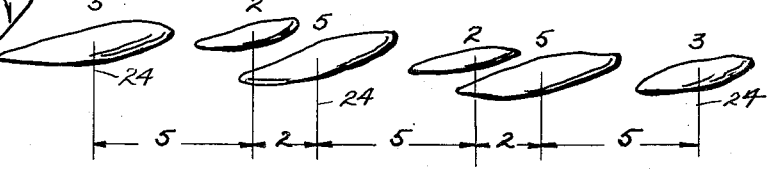
Fig. 2A is a diagrammatic view illustrating the functional operation of the weighing mechanism and showing a series of fish loins wherein the centers of the fish loins have been separated by the weighing mechanism by distances proportional to their weights.

The purpose of the weighing unit 20 is to feed the fish loins or other material to be packed to the entering point or feed chute 21 of the compacting or moulding unit 22 at a uniform average weight rate per unit of time or since the various parts are moving at uniform rates of speed, a uniform weight rate per unit of distance. In Fig. 2A I have illustrated diagrammatically the function which the weighing mechanism may be adapted to accomplish. In this view the centers of weight of the several fish loins have been indicated by the numeral 24. These centers of weight are a distance apart proportional to their weights. Thus in Fig. 2A, reading from left to right, the loins weigh respectively, 5, 2, 5, 2, 5 and 3 pounds. The distances apart are respectively, 5, 2, 5, 2 and 5 units. While the machine may be designed to produce the results of Fig. 2A, I prefer to arrange the machine to produce the result of Fig. 2B. In this figure the pieces are spaced apart by a distance proportional to one-half the sum of the weights of the pieces.

Figure 2B:
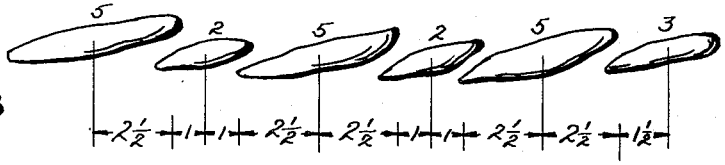
Fig. 2B is a view similar to Fig. 2A showing a method by which the weight per unit of length may be made more nearly uniform, the distance between adjacent loins being half the sum of the weights of the two adjacent loins.
Figure 3:
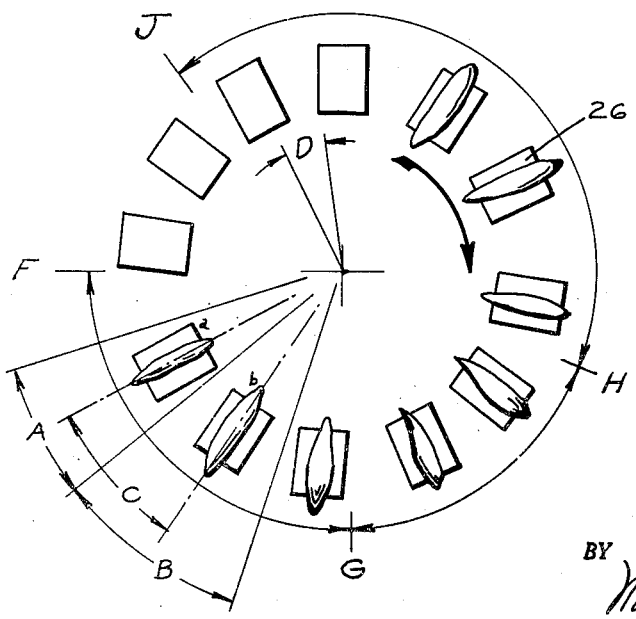
Fig. 3 is a diagrammatic top plan view of the weighing mechanism.

In Fig. 3 I have shown a further diagrammatic representation of the principles of the weighing unit to produce the result of Fig. 2B. Individual weighing scales or platters 26 are traveling in a circular path past a point F where the weighed loins are delivered to the feed chute 21 and thence to the moulding unit 22.

In this diagrammatic illustration, the angle D represents the time or angular distance equivalent to the delivery of one unit weight of loins. For example, if it is assumed that it is desired to deliver a hundred weight units per minute of fish at the point F and the speed of rotation of the weighing scales or platters past the point F is at the rate of one revolution per minute, then the angle D will equal 1/100 of a revolution. The spacing of the loins or scales then will be made by the weighing mechanism in accordance with their weights in terms of the angle D. Considering a loin "a" weighing two pounds and a loin "b" weighing five pounds, as illustrated in Fig. 3, the angular space represented by each respectively will be 2D and 5D or the angles A and B in Fig. 3. The weighing mechanism is then designed to meet the conditions that the angle C between the centers of weights of loins "a" and "b" shall equal the sum of one-half A plus one-half B.

In Fig. 2B, I have illustrated a series of loins which are linearly spaced in accordance with the above, or spaced as they are delivered to the feed chute 21 by the weighing mechanism. Let us assume the first loin (reading from left to right) weighs five pounds, the second loin, two pounds, the third loin, five pounds, the fourth loin, two pounds, the fifth loin, five pounds and the sixth loin, three pounds. Then the distances between the successive loins will be successively seven halves of one unit of distance, seven halves of one unit of distance, seven halves of one unit of distance, seven halves of one unit of distance and eight halves of one unit of distance.

In Fig. 3, I have further indicated three general zones or portions of the circular path of movement of the scales or weighing platters J—H, H—G, and G—F. The functioning of the weighing mechanism in each of these zones will be made more clear hereinafter. For present purposes, it is sufficient to state that in the zone J to H, the scales are unrestricted in their relative angular movement with relation to each other and are free to move faster or slower than the fixed delivery velocity. In this zone, the fish loins are loaded on the scales or platters, either manually or mechanically. In the zone H to G, the weighing action is taking place and the angular spacing between adjacent scales or weighing platters is being automatically adjusted according to the weights of fish loins thereon to fulfill the condition that the distances between the centers of weights of adjacent fish loins shall be one-half of the sum of the weights of the adjacent loins times the unit of distance. In the zone G to F the spacing between adjacent loins has been properly adjusted and fixed in accordance with the above described relationship and the speed of rotation of the weighing scales or platters is fixed to the constant delivery rate for which the machine is designed.

It will be understood that the scales or platters 26 in the zone J to H will be more or less haphazardly spaced and perhaps bunched or spread out according to the way the scales in the weighing and in the delivery zone of the previous rotation happen to be spaced. It will also be observed that due to mechanical limitations, there is a minimum weight limit to which the pieces must conform in order to be handled. Thus, for example, if both loins "a" and "b" in Fig. 3 weighed zero, the corresponding scales or weighing platters 26 would have to coincide. However, by proper selection of the rotational speed of the weighing scales and by properly proportioning the parts, the minimum weight of fish loin which can be handled may be made to fit the practical requirements for which the machine is designed in the packing of tuna or any other material.

Figure 4:
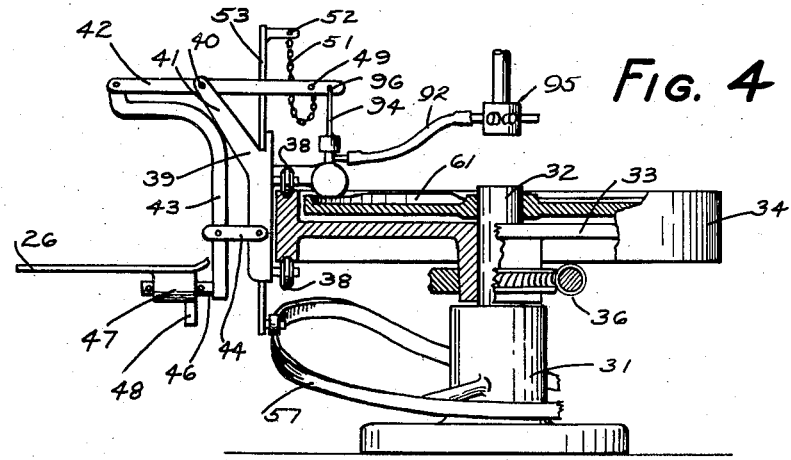
Fig. 4 is a side elevation showing one of the weighing mechanisms and showing partly in section the means for rotating the weighing mechanisms.

In Fig. 4, I have shown in elevation and partial section one form of weighing machine designed to weigh and deliver fish loins at the point F of Fig. 3 and to the feed chute 21 in accordance with the requirements of Fig. 2B. Only one of the weighing scales has been shown in Fig. 4 but it will be understood that a series of them is employed, as illustrated in Fig. 3.

The weighing machine comprises a base 31 adapted to support a stationary shaft 32 upon which is suitably journaled a disc 33 having a preferably T-shaped rim 34. The disc is driven by a prime mover (not shown) at a uniform rate of speed in any suitable manner as by a worm and worm wheel 36. The upper and lower edges of the T-shaped rim are provided with annular V-shaped grooves 37 adapted to receive rollers 38 (Figs. 4 and 7).

The rollers 38 are journaled in a supporting frame 39 in such manner that the supporting frame 39 is carried by the rollers and, unless the frame is locked to the rim in a manner presently described, the rollers are free to roll about the periphery of the T-shaped rim. It will be understood that the disc 33 is driven in positive speed relationship to the speed of operation of other parts of the machine later to be described.

The supporting frame 39 has an angularly extending arm 41 which carries pivoted thereto at 40 a balance beam 42. The pivot 40 constitutes the fulcrum for the balance beam. A hanger 43 is pivoted to one end of the balance beam 42 and is further supported from the supporting frame 39 by a pivot link 44. The lever 43 has secured adjacent the end thereof a rod 46 which through a bored boss 47 carries the weighing platter 26. Either by friction between the parts or by offsetting the platter with respect to the pivot rod and arranging a stop on the offset side, the weighing platter is supported normally in the horizontal position shown in Fig. 4. A lug 48 projects beneath the boss 47 and by means of this lug as will presently appear, the platter is tipped or rotated about the rod 46 when the platter reaches the point F (Fig. 3) to deposit or place the fish loin in the feed chute 21.

The balance beam 42 has secured thereto, as shown at 49, a weighing chain 51. The other end of the weighing chain 51 is connected at 52 to a weighing chain bar 53. The weighing chain bar 53 is supported in the supporting frame by means of rollers 54 so as to be free to reciprocate upward and downward with respect to the supporting frame. A roller 56 is mounted on the lower end of the weighing chain bar 53 (Fig. 6) which rides on a cam track 57 supported from the base, as shown most clearly in Fig. 4. In accordance with the contour of the cam, the weighing chain bar 53 is raised and lowered with respect to the supporting frame 39.

It will now be apparent that upon raising or lowering the weighing chain bar, the counterbalancing effect of the weighing chain 51 on the balance beam may be increased or decreased in accordance with the position of the weighing chain bar.

Mounted on the shaft 32, above the supporting disc 33, is a stationary cam 61. This cam controls the locking of the supporting frames, carrying the weighing mechanisms, to the supporting disc 33. As shown most clearly in Fig. 6, a roller 62 rides on the cam 61 and is carried by a lever arm 63. The lever arm 63 is rigid with a shaft 64 (Fig. 8), one end of which is carried by the supporting frame 39, and the other end of which is carried by a bracket 66. The shaft 64 is free to rotate in its supports and carries a lever arm 67 upon the outer end of which a brakeshoe 68 is adjustably supported. The brakeshoe 68, as shown most clearly in Fig. 7, rides in a slot formed in the supporting frame 39. When the roller 62 reaches the high point of the cam 61, the brakeshoe 68 is actuated so as to engage the groove 37 (Fig. 7) and lock the supporting frame 39, together with the weighing mechanism, with respect to the supporting disc 33 so that the supporting frame 39 rotates with the supporting disc 33.

Attached to the upper end of each weighing chain bar is a cross-piece 71 to each end of which a chain 72 is attached. The chains pass beneath sheaves 73 carried by the supporting frame 39. The chain 72 of each weighing chain bar is attached to the next adjacent weighing chain bar to form a continuous chain assembly connecting all of the weighing chain bars, as illustrated in Fig. 5 diagrammatically.

Figure 5:
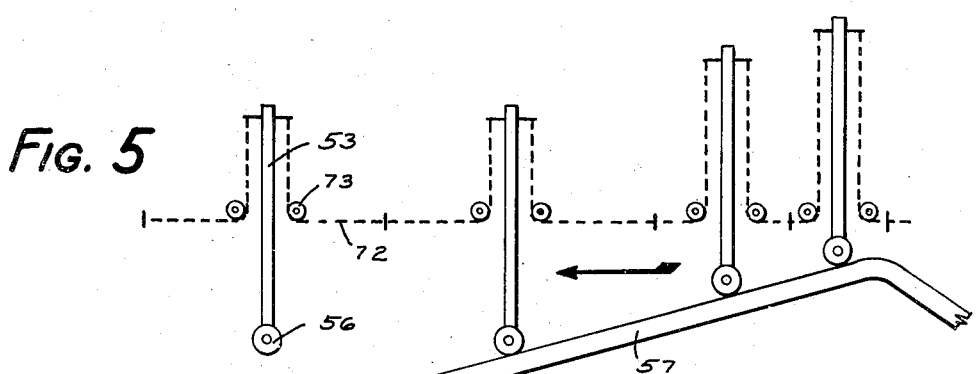
Fig. 5 is a diagrammatic view illustrating the principles employed in the weighing mechanism whereby the fish loins are spaced apart by distances proportional to their weights.

It will now be apparent from Fig. 5 that two adjacent scales are drawn nearer together as the weighing chain bar rises under the control of the cam track 57 or allows them to spread as the weighing chain bar is lowered. As shown in the drawings, the weighing chain bars are connected together by chains but it will be appreciated that any other flexible connecting means such as steel tape may be used, if desired.

Figure 6:
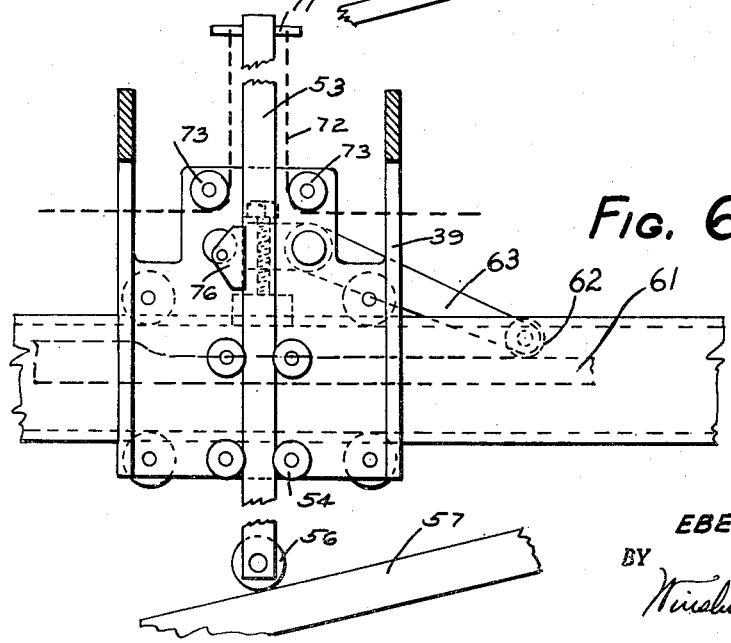
Fig. 6 is a front elevation of a portion of the weighing mechanism.

Normally, the weighing chain bars are free to rise and fall in accordance with the contour of the cam 57, but each weighing chain bar may be locked in any position by a braking shoe 76 (Figs. 6, 7 and 8). The braking shoe 76 is carried by a pin 77 extending eccentrically from a shaft 78. The shaft 78 is journaled in the supporting frame 39 and in the bracket 66, as shown at 79.

An operating lever 81 is mounted on the end of the shaft 78 (Fig. 7). A member 83, adjustable as indicated at 82 (Fig. 8), is connected to the arm and is connected, as diagrammatically illustrated at 84, to a diaphragm 85. The diaphragm, together with a housing 86, provides a vacuum chamber 87 which is connected to a pipe 88, the upper end of which is open as shown at 89. A branch line 91 is connected by a tube 92 to a rotatable multiple head 95 which rotates on a vacuum pipe connected to a vacuum pump (not shown).

While other means might be employed for actuating the brakeshoe, I have shown a vacuum operated diaphragm for the reason that in canneries, air-lines are generally available and it offers a rapidly acting, quickly responsive, shockproof means of accomplishing the desired results. A cup-shaped valve 93 is adapted to close the open end 89 of the pipe 88. As shown most clearly in Fig. 4, the valve is suspended by an element 94 from the outer end of the balance beam, as shown at 96.

It will now be observed that when the end of the balance beam from which the valve is suspended, is lowered so as to close the opening 89 in the pipe 88, a vacuum is applied in the vacuum chamber 87. This sub-atmospheric pressure rotates the shaft slightly so as to apply the brakeshoe 76 through the eccentric pin 77 to arrest the weighing chain bar in the position which it occupies at the time the brakeshoe is applied.

Upon referring to Fig. 3, it will be recalled that in the section G—F, the scales are moving at the constant speed of rotation of the supporting disc 33; that is, the location of the high point of the cam 61 is such that the weighing assemblies are locked to the supporting disc 33 approximately at or prior to arrival at the point G. The brakeshoes 68 of the weighing assemblies beyond the point G then being in engagement with the V-shaped grooves 37 of the supporting disc, there are always several of the weighing assemblies locked to the disc and traveling at the same speed as the disc at any particular time. These locked weighing assemblies, by means of connecting chains 72 of Fig. 5, continually act to draw the free weighing assemblies behind them. Those weighing assemblies which are not locked to the supporting disc, continually lag so as to draw the connecting chains 72 substantially taut particularly because of the resistance or drag of the weighing scale bars 53 in being brought over the high point of the cam 57.

Upon referring to Fig. 5, it will be noted from the arrow that each weighing assembly is being drawn by those weighing scales which are locked with respect to the supporting disc 33 from right to left. Each weighing chain bar is successively first brought to the highest position with respect to the cam 57 from which position it is gradually allowed to lower, as illustrated in Fig. 5.

Upon reference to Fig. 4, it will be observed that when the weighing chain bar is in the highest position, the least counter-balancing weight of the weighing chain 51 is applied on the balance beam 42. Correspondingly, the particular weighing assembly at the high point of the cam is also drawn to its closest position with respect to the two adjacent weighing assemblies.

As the weighing assembly continues to be moved to the left, as viewed in Fig. 5, the bar is allowed to fall under the control of the cam 57, thus increasing the weight of the chain 51 applied to the balance beam. At some point in the downward movement of the weighing chain bar 53, the counter-balance applied overcomes the weight of the fish loin applied on the weighing platter and allows the balance beam to drop. The dropping of the balance beam closes the valve 93 and applies the brakeshoe 76 on the weighing chain bar to lock it in a position with reference to the supporting frame, corresponding to the weight of fish loin on the weighing platter. The high point of the cam 57 occupies a position corresponding to the position H of Fig. 3, so that the weighing chain bars are locked during their movement from H to G, and as previously mentioned, the weighing assemblies are locked with respect to the supporting disc 33 at about or prior to the point G.

It now will be clear that under the control of the chains, the spread allowed between adjacent weighing platters, as controlled by the weight of fish loin on each platter, is proportional to the weight of the fish on each platter necessary to be overcome before the weighing chain bar is locked.

By proper proportioning of the parts, the spread contributed between adjacent weighing assemblies by the over-balancing or locking weights can be made to fulfill the conditions of Figs. 2B and 3. With the spread or spacing between adjacent weighing assemblies established during the weighing portion of the rotation of the supporting disc; that is, between H and G, and with their rotational speed thereafter brought to the established constant speed of the supporting disc 33, the speed of which is established by the desired weight of fish loins to be brought to the point F per unit of time or distance, it will be apparent that the loins or other weighed objects will be delivered to the feed chute 21 in a manner corresponding to that shown in Fig. 2B.

As shown most clearly in Figs. 9 and 10, the feed chute has extending therefrom an arm 131 adapted to successively engage the projections 48 extending from the bottom of the weighing platters so as to rotate each platter in turn, as shown in Fig. 9, and dump the fish loin therein onto the feed chute. It will be particularly noted from Fig. 9 that it is desirable to lay the loins on the scales in a manner such that when inverted, the loins will lie with the natural grain curvature of the fish in the same direction as the curvature of the feed chute.

As shown most clearly in Figs. 11 and 12, the feed chute includes a substantially semicylindrical trough 102, which has a series of helically arranged cut-outs 103 therein. Arranged to project through the helical slots, are a plurality of helical projections 104 having teeth 106 extending upward therefrom so that the teeth project inward, when in operative position, beyond the wall of the trough 102 so as to engage the fish loins lying in the trough.

The helical projections are carried by a pair of backing members 107 which are pivoted relative to each other as shown at 108. The backing members are pivoted to an operating member 109 which is pivotly connected, as shown at 110, to a connecting rod 111 operated by an eccentric 112. The backing member 109 has a pair of cams 113 mounted thereon which are driven by shafts 114. The cams 113 serve to hold the helical projections in contact with the fish during the forward part or stroke movement of the helical projections or the movement, as viewed in Fig. 10, of the helical projections from left to right as viewed in that figure. The eccentric 112 causes the movement from left to right as viewed in Fig. 12. The helical projections are in contact with the fish during movement of the eccentric from the position shown in Fig. 12 to a position in the direction of the arrow 180 degrees spaced therefrom. During the return movement of the eccentric, the low points of the cams 113 are in engagement with the helical projections and the projections are withdrawn from engagement with the fish loins.

The result of the action of the cams 113 and eccentric 112 on the helical projections is to cause the fish loins to move from left to right, as viewed in Fig. 10, and forwardly toward the moulding unit 22. The cams 113 and eccentric 112 are driven in timed relation to the rotation of the supporting disc 33 so that during their travel through the feed chute the loins maintain the relationship shown in Fig. 2B.

As the fish loins emerge from the feed chute, they enter the first of a series of chucks or compactors which constitute the moulding unit 22. Each of the chucks includes a main supporting frame 116 which is a partial ring (Fig. 13). Each of the rings is provided with a pair of lugs 117 which have bores 118, for the reception of a pair of parallel mounted support rods. The support rods 119 extend lengthwise of the moulding unit and support the entire series thereof.

The chucks may be similar to the chucks or compacting units shown in my co-pending application, Serial No. 531,491, filed April 17, 1944, now Patent Number 2,475,422 issued on July 5, 1949, and entitled Machine for Packing Products, to which reference is made for a detailed description of the chucks per se. In general, the chucks comprise a pair of rings 121 and 122 which are held in the supporting ring 116 by means of an annular ledge 123 and an annular ring 124. The annular ring 121 has a series of lugs 126 adapted to support in pivotal relation chuck elements or compacting fingers 127. The ring 122 has extending therefrom a series of lugs 128 to which are pivoted a series of links 129 which are pivoted to the fingers as shown at 130. The functioning and operation of the fingers 127 and links 129 are fully described in my above mentioned co-pending application and it is sufficient to say herein that the fingers lie in a closed position as shown in Fig. 13. However, upon rotation of the ring 122, with respect to the ring 121, the fingers are retracted and swung about their pivots 126 to enlarge the opening 131 at the center of the fingers.

Each of the rings 121 and 122 has a lug 132 which is bifurcated so as to receive, between the bifurcations, a block 133. The blocks are pivoted with respect to the lugs and through each of the blocks a pitman 134 and 135 extends. A spring stop element 136 is mounted on each of the pitmans 134 and 135 and between the stops 136 and the blocks 133 there are interposed springs 137.

As shown most clearly in Fig. 19, the pitmans 134 and 135 are connected to suitable eccentrics 138, mounted on a shaft 139. The shaft 139 is driven, as indicated in the drawings by an arrow, in timed relation with respect to the rotation of the supporting disc 33 so that the chucks are actuated in timed relation with the rotation of the supporting disc.

Figure 1:
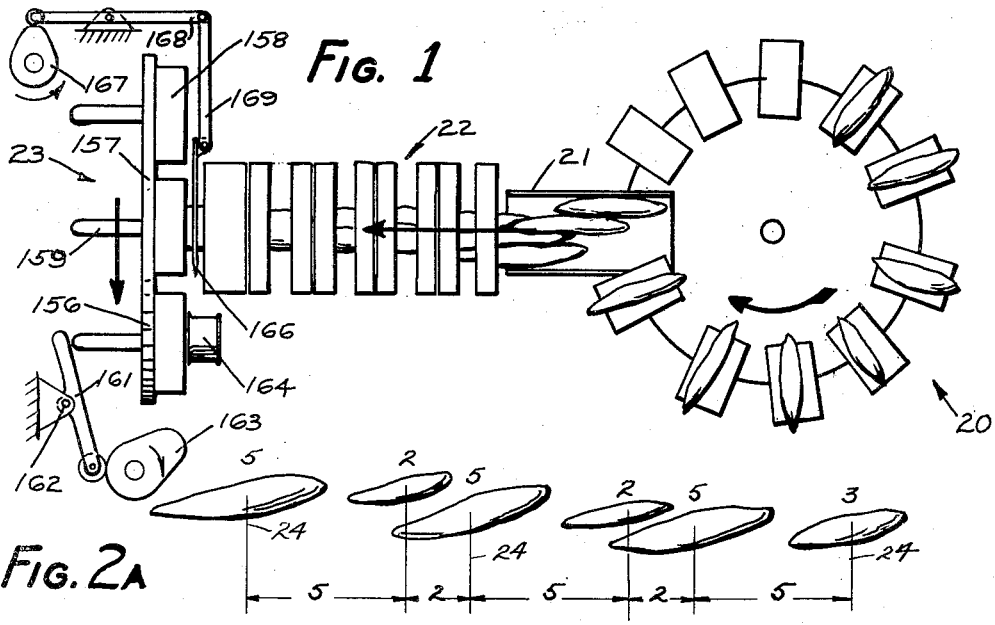
Fig. 1 is a diagrammatic plan view of the apparatus of my invention and illustrating how the general method of my invention is carried out.

A pair of chucks of the moulding unit are shown in Fig. 19. The chuck 141 is a movable chuck, while the chuck 142 is a stationary chuck. The moulding unit 22 (Fig. 1) comprises a series of pairs of chucks similar to the chucks 141 and 142. Any desired number of pairs of chucks may be employed necessary to accomplish the function of moulding and compacting the fish loins.

The movable chucks 141 are movable along the support rods 119, being actuated by cams 143. The machine is provided with suitably journaled push rods 144 to which the movable chucks 141 are rigidly secured, as shown at 146. A spring 147, one end of which engages a fixed abutment 148, and the other end of which engages a collar 149 fixed to the push rod, normally urges a roller 151 on the end of the push rod into engagement with the cams 143. The cams 143 are also operated in synchronism and in time relation with the rotation of the supporting disc 33 so that the movable chucks are shifted to the left, as viewed in Fig. 19, to move the cylinder of fish along the moulding unit to the packing station 23, in timed relation with the operation of the supporting disc.

Figure 15:
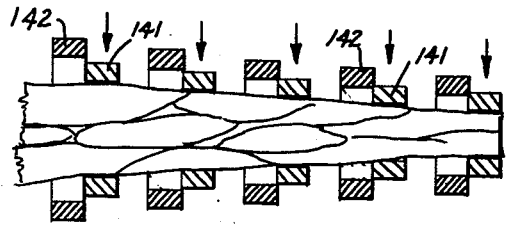
Figure 16:
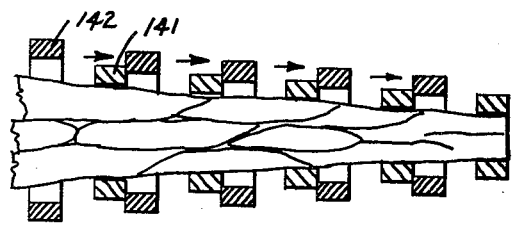

In Figs. 15 to 18 inclusive, I have illustrated diagrammatically, the operation of the feeding and compacting chucks of the moulding unit 22. The fish loins are projected into the first chuck on the forward motion of the helical projections 104 (Fig. 11). The timed relation of the parts is such that the first chuck is open during this movement, as shown in Fig. 16. While this first chuck is open, together with all of the stationary chucks, the movable chucks 141 are closed and moving in the direction of the arrow, as shown in Fig. 16. At the end of the forward movement of the movable chucks, the movable chucks are opened, as shown in Fig. 17 and the stationary chucks are closed.

During this period, the helical projections 104 are out of engagement, the loins lying in the feed chute. The loins in this moulding unit are held by the stationary chucks during the retraction or return movement of the movable chucks, as illustrated in Fig. 18. At the end of the return movement of the movable chucks, the movable chucks close and the stationary chucks open, as illustrated in Fig. 15. At the start of the movement of the movable chucks to the right, as viewed in Fig. 15, the stationary chucks are open to receive loins fed from the feed chute.

On the pitman 134, I have shown the spring 137 which causes the links 129 to close the fingers to the contracted position shown in Fig. 13 with a yielding force. The springs 137 are more yieldable at the entrance end of the moulding unit. The springs of succeeding chucks are progressively increased in strength so that, as illustrated in Figs. 15 to 18 inclusive, the cylinder of fish loins is gradually contracted to the diameter of the can into which the fish is to be packaged. In the last mould of the unit, the spring 137 is omitted so that the fingers are always contracted to a definite amount, and the circle 131 (Fig. 13) is of fixed diameter.

The pitman 135, together with its spring connections to the ring 121, serves to give the fingers a yielding rotational movement during the closing and the opening of the chucks. This rotational movement is desirable in order to continue the rotation given in the feed chute. The springs 137 on the pitman 135 are also progressively increased in strength and on the last chuck the spring is omitted.

The above action not only moves the whole mass forward in successive steps, but gradually reduces the uneven section of the mass to a compact and regular section. It will be noted from Fig. 9 and as previously mentioned that the loins are placed in the feed chute with the natural grain structure of the fish conforming substantially in curvature to the curvature of the feed chute. With the loins arranged in this manner, as they are fed into the moulding unit, the alternate gripping and relaxing action of the chucks has a tendency to cause some slippage of the flakes of the fish loins so that the heavier sections will average with the lighter sections. This alternate gripping and relaxing of the chucks or kneading of the fish loins is assisted by the rotational movement of the chuck fingers during the closing thereof, the fish flakes having a tendency to shift longitudinally of the moulding unit so as to average out the high spots with the low spots and produce a cylindrical mass of substantially constant weight per unit of length. It will be, of course, understood that while the weight of material over any substantial length is constant per unit of length when it is received in the feed chute, the high and low portions of weight within the short distances in which they occur, must be leveled so as to produce a substantially constant weight per unit of length.

The mechanism of the packing station 23 includes a turret 156 which is indexed by suitable mechanism (not shown) in timed relation with the rotation of the supporting disc 33. The turret includes a base plate 157 which has a plurality of chucks 158 mounted thereon similar in construction and operation to the chucks shown in Fig. 13. The base plate 157 has a series of openings therein corresponding in location to the opening 131 shown in Fig. 13. Plungers, operated by push rods 159, are mounted in these openings, in a manner similar to that shown and described in my above mentioned copending application. A lever 161, fulcrumed at 162, is actuated by a cam 163 driven in timed relation to the rotation of the supporting disc 33. By any suitable mechanism, cans 164 are presented to the chucks in timed relation to the movement of a chuck to the packing position shown in Fig. 1. Upon actuation of the lever 161, the push rod is actuated to force the plunger and discharge the contents of the chuck in alignment with the can 164 into the can.

Each indexing of the turret presents one of the chucks 158 in alignment with the last chuck of the moulding unit 22. A cut-off knife 166 cuts a cylinder of fish loin flush with the face of the chuck mounted on the turret, the cut piece conforming in weight substantially to that desired to be placed in the can. The cut-off knife 166 is actuated in any suitable manner as by a cam 167 driven in timed relation to the rotation of the supporting disc 33. The cam actuates a lever 168 and a link 169, diagrammatically illustrated in Fig. 1, connected to the cut-off knife.

It will now be appreciated that all operations are driven in timed relation to the rotation of the supporting disc 33. The disc 33 delivers a substantially constant weight of fish loins to the feed chute per unit of time or distance. The loins are fed from the feed chute to the moulding unit 22 which serves to compact mould and level out the relatively short discrepancies in constant weight per unit of length. From the moulding unit, the loins are fed to the chucks mounted on the turret 156, the proper length of fish loins cut off, and this length of fish is pushed into the can upon indexing of the turret and actuation of the plunger.

While I have shown and described the preferred forms of my invention, it will be apparent that various changes and modifications may be made therein, particularly in the form and relations of parts without departing from the subject of my invention as set forth in the appended claims.

I claim:

1. A method of packing food components which are of variable size and weight and which are of a flabby moldable character which includes the steps of feeding the components to a molding station with the spacing of the components being variable but at an approximately constant weight rate per unit of time, and compacting and compressing the components to mold the components into an elongated substantially cylindrical mass of substantially uniform cross section.

2. A method of packing food components which are of variable size and weight and which are of a flabby moldable character which includes the steps of feeding the components to a molding station with the spacing of the components being variable but at an approximately constant weight rate per unit of time, and compacting and compressing the components to mold the components into an elongated substantially cylindrical mass of substantially constant weight per unit of length.

3. A method of packing food components which are of variable size and weight and which are of a flabby moldable character which includes the steps of feeding the components to a molding station with the spacing of the components being variable but at an approximately constant weight rate per unit of time, compacting and compressing the components to mold the components into an elongated substantially cylindrical mass of substantially constant weight per unit of length, and cutting said cylindrical mass into sections of uniform length.

4. A method of packing food components which are of variable size and weight and which are of a flabby moldable character which includes the steps of feeding the components to a molding station with the spacing of the components being variable but at an approximately constant weight rate per unit of time, compacting and compressing the components to mold the components into an elongated substantially cylindrical mass of substantially constant weight per unit of length, cutting said cylindrical mass into sections of uniform length, and transferring each of said sections to a container into which it is to be packed.

5. A method of packing food components which are variable in weight which comprises spacing the components apart a variable distance and a distance proportional to their weight, feeding the components and compacting them while the variable but proportional spacing of the components is maintained, and packing a substantially predetermined weight of the components in a container.

6. A method of packing food components which are variable in weight which comprises separately weighing the components, spacing the components a variable distance apart but a distance proportional to their weight, compacting the components to form an elongated mass of substantially uniform weight per unit of length, and packing uniform lengths of the elongated mass in successive containers.

7. In a method of packing food components which are variable in weight the steps of weighing the components and separating the components variable distances apart but distances proportional to their weights.

8. In a method of packing food components which are variable in weight the steps of weighing the components and discharging the components after weighing at variable intervals of time but at intervals of time substantially proportional to the weights of the components.

EBEN H. CARRUTHERS.

REFERENCES CITED

The following references are of record in the file of this patent:

UNITED STATES PATENTS

| Number | Name | Date |
| --- | --- | --- |
| 457,847 | Carlie | Aug. 8, 1891 |
| 1,337,374 | Vail et al. | Apr. 20, 1920 |
| 1,467,442 | Mason | Sept. 11, 1923 |
| 1,482,667 | Van Houten | Feb. 5, 1924 |
| 1,619,729 | Howard | Mar. 1, 1927 |
| 2,037,724 | Jacobs et al. | Apr. 21, 1936 |
| 2,138,475 | Hilton | Nov. 29, 1938 |
| 2,156,895 | Godat | May 2, 1939 |
| 2,217,392 | Warfield | Oct. 8, 1940 |
| 2,326,146 | Kurzbin | Aug. 10, 1943 |
| 2,339,584 | Rice | Jan. 18, 1944 |
| 2,353,746 | Moore | July 18, 1944 |
| 2,382,729 | Kurzbin | Aug. 14, 1945 |